United States Patent
Xia et al.

(10) Patent No.: US 12,340,593 B2
(45) Date of Patent: Jun. 24, 2025

(54) VEHICLE DRIVABLE AREA DETECTION METHOD, SYSTEM, AND AUTONOMOUS VEHICLE USING THE SYSTEM

(71) Applicant: Shenzhen Yinwang Intelligent Technologies Co., Ltd., Shenzhen (CN)

(72) Inventors: Lang Xia, Chengdu (CN); Yiqiang Chen, Shenzhen (CN); Yujie Shen, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 287 days.

(21) Appl. No.: 18/054,353

(22) Filed: Nov. 10, 2022

(65) Prior Publication Data

US 2023/0072637 A1 Mar. 9, 2023

Related U.S. Application Data

(63) Continuation of application No. PCT/CN2020/089528, filed on May 11, 2020.

(51) Int. Cl.
*G06V 20/58* (2022.01)
*B60W 60/00* (2020.01)
(Continued)

(52) U.S. Cl.
CPC .......... *G06V 20/58* (2022.01); *B60W 60/001* (2020.02); *G01C 21/3815* (2020.08);
(Continued)

(58) Field of Classification Search
CPC .......... G01C 21/3815; G01C 21/3461; G01C 21/32; G01C 21/343; G01S 13/89;
(Continued)

(56) References Cited

U.S. PATENT DOCUMENTS 6,163,252 A * 12/2000 Nishiwaki ............. G01S 17/931
342/70
10,445,871 B2 * 10/2019 Lim ....................... G06T 7/0006
(Continued)

FOREIGN PATENT DOCUMENTS

CN 103176185 A 6/2013
CN 105549597 A 5/2016
(Continued)

OTHER PUBLICATIONS

Xiangmo Zhao et al.,"Fusion of 3D Lidar and Camera Data for Object Detection in Autonomous Vehicle Applications", IEEE Sensors Journal, vol. 20, No. 9, May 1, 2020, total 13 pages.
(Continued)

*Primary Examiner* — Adam R Mott
*Assistant Examiner* — Sagar K C
(74) *Attorney, Agent, or Firm* — Leydig, Voit & Mayer, Ltd.

(57) ABSTRACT

This application discloses a vehicle drivable area detection method, an autonomous driving assistance system, and an autonomous driving vehicle. The method includes: processing, by using a neural network, image data obtained by a camera apparatus, to obtain a first probability distribution of an obstacle; obtaining a second probability distribution of the obstacle based on a time of flight and an echo width of a radar echo signal; and obtaining, based on the first probability distribution of the obstacle and the second probability distribution of the obstacle, a drivable area of a vehicle represented by a probability, where the probability is a probability that the vehicle cannot drive through the area. The autonomous driving assistance system includes a camera apparatus, at least one radar, and a processor. The system is configured with the technical solutions that can implement
(Continued)

the method. The autonomous driving vehicle includes the foregoing autonomous driving assistance system.

17 Claims, 6 Drawing Sheets

(51) Int. Cl.
*G01C 21/00* (2006.01)
*G01S 13/89* (2006.01)
*G01S 13/931* (2020.01)
*G06V 10/26* (2022.01)
*G06V 10/82* (2022.01)
*G06V 20/54* (2022.01)
*G06V 10/774* (2022.01)

(52) U.S. Cl.
CPC ............ *G01S 13/89* (2013.01); *G01S 13/931* (2013.01); *G06V 10/26* (2022.01); *G06V 10/82* (2022.01); *G06V 20/54* (2022.01); *B60W 2420/403* (2013.01); *B60W 2420/408* (2024.01); *G06V 10/774* (2022.01)

(58) Field of Classification Search
CPC ...... G01S 13/931; G06V 10/26; G06V 10/82; G06V 20/54; G06V 10/774; G06V 10/811; G06V 20/52; G06V 10/267; G06V 20/56; G06V 20/58; B60W 2420/403; B60W 2420/408; B60W 60/001; G06F 16/5854; G06F 16/29; G06F 18/2415; G06F 18/256; G06N 3/0455; G06N 3/0464; G06N 3/08; G06N 3/045

See application file for complete search history.

(56) References Cited

U.S. PATENT DOCUMENTS

| | | | | |
|---|---|---|---|---|
| 11,131,768 | B2* | 9/2021 | Hung | G01S 13/878 |
| 11,273,838 | B2* | 3/2022 | Du | G06F 18/295 |
| 2012/0127013 | A1* | 5/2012 | Nishiyama | G01S 7/412 |
| | | | | 342/27 |
| 2017/0036565 | A1* | 2/2017 | Ohno | B60N 2/42736 |
| 2017/0287137 | A1* | 10/2017 | Lin | G06V 10/454 |
| 2017/0345182 | A1* | 11/2017 | Sano | G06T 7/73 |
| 2018/0238677 | A1* | 8/2018 | Cournoyer | G01B 11/002 |
| 2018/0253980 | A1 | 9/2018 | Mohamadi | |
| 2019/0050000 | A1* | 2/2019 | Kennedy | G05D 1/102 |
| 2019/0258878 | A1* | 8/2019 | Koivisto | G06V 10/46 |
| 2019/0392256 | A1* | 12/2019 | Cho | G06V 10/764 |
| 2020/0103523 | A1 | 4/2020 | Liu et al. | |
| 2020/0134396 | A1 | 4/2020 | Porta | |
| 2020/0148215 | A1* | 5/2020 | Mohajerin | G06N 3/045 |
| 2020/0302214 | A1* | 9/2020 | Arani | G06V 10/454 |
| 2021/0158533 | A1* | 5/2021 | Cui | G06T 1/20 |
| 2021/0306586 | A1* | 9/2021 | Yamamoto | G06V 20/56 |
| 2022/0163650 | A1* | 5/2022 | Min | G06F 3/01 |

FOREIGN PATENT DOCUMENTS

| | | |
|---|---|---|
| CN | 105865449 A | 8/2016 |
| CN | 106945660 A | 7/2017 |
| CN | 107202983 A | 9/2017 |
| CN | 107506711 A | 12/2017 |
| CN | 107521493 A | 12/2017 |
| CN | 107609522 A | 1/2018 |
| CN | 107895161 A | 4/2018 |
| CN | 107918118 A | 4/2018 |
| CN | 108256413 A | 7/2018 |
| CN | 108281041 A | 7/2018 |
| CN | 108568868 A | 9/2018 |
| CN | 108764108 A | 11/2018 |
| CN | 108780319 A | 11/2018 |
| CN | 108959321 A | 12/2018 |
| CN | 109241855 A | 1/2019 |
| CN | 109444902 A | 3/2019 |
| CN | 109515324 A | 3/2019 |
| CN | 109532821 A | 3/2019 |
| CN | 109543600 A | 3/2019 |
| CN | 109544990 A | 3/2019 |
| CN | 109624852 A | 4/2019 |
| CN | 109682381 A | 4/2019 |
| CN | 109814112 A | 5/2019 |
| CN | 109895763 A | 6/2019 |
| CN | 109927719 A | 6/2019 |
| CN | 110008848 A | 7/2019 |
| CN | 110018496 A | 7/2019 |
| CN | 110045376 A | 7/2019 |
| CN | 110084086 A | 8/2019 |
| CN | 110136254 A | 8/2019 |
| CN | 110211420 A | 9/2019 |
| CN | 110245710 A | 9/2019 |
| CN | 110550029 A | 12/2019 |
| CN | 110619312 A | 12/2019 |
| CN | 110633597 A | 12/2019 |
| CN | 110738081 A | 1/2020 |
| CN | 110827329 A | 2/2020 |
| CN | 110850413 A | 2/2020 |
| CN | 110858076 A | 3/2020 |
| CN | 110865421 A | 3/2020 |
| CN | 110988885 A | 4/2020 |
| FR | 2883825 A1 | 10/2006 |
| JP | 2017132285 A | 8/2017 |
| JP | 2018077829 A | 5/2018 |
| JP | 2019008796 A | 1/2019 |
| JP | 2019211900 A | 12/2019 |
| KR | 20190072015 A | 6/2019 |
| WO | 2016103464 A1 | 6/2016 |
| WO | 2019178319 A1 | 9/2019 |

OTHER PUBLICATIONS

Radu Gabriel Danescu,"Obstacle Detection Using Dynamic Particle-Based Occupancy Grids", 2011 International Conference on Digital Image Computing: Techniques and Applications, Total 6 Pages.

Gao Zhenhai,"The Research on Drivable Region Modeling for Intelligent Vehicle and Display Technique of Driver Assistance Information", Jilin University, 2019, 12 issues, with an English abstract, total 105 pages.

Sebastian Ramos et al.,"Detecting Unexpected Obstacles for Self-Driving Cars: Fusing Deep Learning and Geometric Modeling", arXiv:1612.06573v1 [cs.CV] Dec. 20, 2016, total 8 pages.

Hughes Ciaran et al: "DriveSpace: Towards context-aware drivable area detection", Electronic Imaging, vol. 31, No. 15, Jan. 13, 2019 (Jan. 13, 2019), pp. 42-1, XP093038261, total 10 pages.

Zhou Su et al.,"Research on Drivable Area Segmentation Algorithms Based on Knowledge Distillation", Automobile Technology, 2020, Issue 01, with an English abstract, total 5 pages.

Ye Zhang et al.,"A Realtime Algorithm for Distinguish Obstacle from Accessible Area in 3D Scene", CISAT 2019, Journal of Physics: Conference Series, doi:10.1088/1742-6596/1345/4/042037, total 6 pages.

Wang Changren,"Multi-radar Detection and Tracking Technology for Intelligent Vehicles", Multi-radar Detection and Tracking Technology for Intelligent Vehicles, 2019 Issue 05, with an English abstract, total 98 pages.

Jianmin Duan et al., Abstract of "Grip Map Updating and Obstacle Detection Based on Improved Bayesian Interference", Laser Journal, 2017, Issue 8, 13-18, total 3 pages.

* cited by examiner

VEHICLE DRIVABLE AREA DETECTION METHOD, SYSTEM, AND AUTONOMOUS VEHICLE USING THE SYSTEM

CROSS-REFERENCE TO RELATED APPLICATIONS

This application is a continuation of International Application No. PCT/CN2020/089528, filed on May 11, 2020, which is hereby incorporated by reference in its entirety.

TECHNICAL FIELD

This application relates to the autonomous driving field, furthermore, to a vehicle drivable area detection method, a system, and an autonomous driving vehicle using the system.

BACKGROUND

With rapid development of 5G communication and internet of vehicles technologies, autonomous driving technologies have become a hot research topic. Core technologies in the autonomous driving field include intelligent environment perception, autonomous navigation and positioning, driving behavior decision-making, intelligent path planning and control, and the like. In the autonomous driving technologies, vehicle drivable area detection is a basic requirement for implementing autonomous driving. A vehicle needs to recognize drivable areas and non-drivable areas before route planning. In some specific autonomous driving assistance functions (for example, parking), drivable area recognition is particularly important. Autonomous parking is used as an example, and the following conditions need to be met: (1) The vehicle finds a feasible route from a current position to a target parking spot in an environment including various obstacles; and (2) the vehicle does not collide with moving or static obstacles during driving. Therefore, requirements for a vehicle-mounted sensor system are high. A sensor should provide coordinate information of an obstacle relative to the vehicle in a current environment as accurately as possible, to recognize a drivable area of the vehicle in the environment.

In the conventional technology, the sensor is usually configured to obtain and analyze surrounding environment information of the vehicle, to obtain a drivable environment around the vehicle. However, drivable area recognition is usually not accurate enough in the conventional technology. Therefore, a new vehicle drivable area detection method is needed, so that the driving environment and the drivable area around the vehicle can be more accurately recognized.

SUMMARY

According to a first aspect of this application, a vehicle drivable area detection method is provided, including: processing, by using a neural network, image data obtained by a camera apparatus, to obtain a first probability distribution of an obstacle; obtaining a second probability distribution of the obstacle based on a time of flight and an echo width of a radar echo signal; and obtaining, based on the first probability distribution of the obstacle and the second probability distribution of the obstacle, a drivable area of a vehicle represented by a probability, where the probability indicates a probability that the vehicle cannot drive through the area. In the method in this application, two sensors: a camera apparatus and a radar are integrated, obstacle distribution information obtained by the two sensors is fused, and the drivable area of the vehicle obtained after fusion is represented in a form of a probability. Therefore, information about the obstacle around the vehicle can be comprehensively obtained, and a detection blind spot caused by a blind spot of the camera apparatus or a detection range of the radar is avoided. In addition, the drivable area of the vehicle is represented in a form of a probability, so that the vehicle has a more comprehensive understanding of the drivable area around the vehicle. That is, the area around the vehicle is not either capable of driving or incapable of driving, some areas may be capable of driving under a specific condition. In this way, navigation planning of the vehicle is more flexible.

With reference to a possible implementation of the first aspect, the camera apparatus includes at least one of the following: a fisheye camera, a wide-angle camera, and a wide-field-of-view camera. The radar echo signal includes an echo signal of at least one of the following radars: an ultrasonic radar, a laser radar, or a millimeter-wave radar. Alternatively, any other suitable apparatus or radar may be used in the technical solutions of this application.

With reference to a possible implementation of the first aspect, the radar may be disposed on the vehicle, or may be disposed on apparatuses on two sides of a road, and the camera may be disposed on the vehicle, or may be disposed on apparatuses on two sides of a road. The apparatuses on the two sides of the road may include but are not limited to a roadside lamp post, a speed measuring rod, a communication base station tower, and the like. The vehicle may obtain the information about the obstacle around the vehicle completely by using the camera apparatus and the radar that are disposed on the vehicle, or may obtain the information about the obstacle around the vehicle jointly by using some sensors (for example, only the camera apparatus is disposed) disposed on the vehicle and other sensors disposed on the apparatuses on the two sides of the road.

With reference to another possible implementation of the first aspect, the recognized drivable area of the vehicle or the probability that the vehicle cannot drive through the area may be represented by using a probability grid map. On the probability grid map, each grid includes a probability value, and the probability value indicates a probability that the vehicle can drive in the grid. A probability distribution of the drivable area around the vehicle can be clearly expressed through the probability grid map. This provides an accurate basis for subsequent route planning. The probability grid map may be displayed on a display apparatus (for example, but not limited to a central control screen in a cockpit) of the vehicle, to intuitively provide a reference indication for a driver. The probability grid map may also be sent to an autonomous driving assistance system of the vehicle, so that the autonomous driving assistance system obtains the information about the obstacle around the vehicle.

With reference to another possible implementation of the first aspect, semantic segmentation processing may be performed, by using the neural network, on image data obtained by using a fisheye camera. In some embodiments, an image may be first transformed into a top view, and then semantic segmentation processing is performed on a transformed image. After the image is transformed into the top view, an environment around the vehicle can be comprehensively shown. Semantic segmentation processing may be performed on the transformed image by using the neural network, that is, classification of different objects/people in the image is determined based on recognition of the neural network. For example, the neural network may be used to determine a part in the image that is a building and another part in the image that is a vehicle. In some embodiments, a neural network including an encoder-decoder (Encoder-Decoder) structure may be used to perform the foregoing semantic segmentation process on the image. An encoder performs dimension reduction on data by using a pooling layer, and a decoder performs dimension increase on the data by using a deconvolutional layer. Through the dimension reduction-dimension increase process, semantic segmentation can be performed on the image, and details of the image can be retained as much as possible. Through the foregoing semantic segmentation process of the image by using the neural network, an object/person in the environment around the vehicle can be recognized, so that a distribution of obstacles around the vehicle can be better determined.

With reference to another possible implementation of the first aspect, a plurality of frames of images that are adjacent or spaced in terms of time may be input into the neural network for recognition. Parallax information of a same object in different image frames may be used as a recognition feature of the neural network by using the plurality of frames of images that are adjacent or spaced in terms of time, so that the neural network can better recognize the object in the image. Output of the neural network includes a type of the obstacle, and the first probability distribution of the obstacle can be determined based on the type of the obstacle.

With reference to another possible implementation of the first aspect, in a process of training the neural network, an obstacle mapping method may be used. The obstacle mapping method means that an obstacle close to the vehicle is manually "mapped" in a training image of the neural network. In this method, a large amount of recognition information about the obstacle close to the vehicle can be obtained in the training process of the neural network, so that if there is an actual obstacle around the vehicle subsequently, a problem that the obstacle cannot be recognized or the obstacle is wrongly recognized because a training set does not include such data (the obstacle close to the vehicle) is avoided.

With reference to another possible implementation of the first aspect, in a loss function of the neural network, a high weight is given to a loss function of a small obstacle. With this setting, the neural network may be more "sensitive" to recognition of the small obstacle, because in practice, most vehicle collisions are not caused by a large obstacle (for example, another vehicle) but a small obstacle (for example, a roadside parking lock).

With reference to another possible implementation of the first aspect, a plurality of radars distributed around the vehicle are used to obtain an echo signal and a time of flight of the obstacle around the vehicle. If the radars are ultrasonic radars and the ultrasonic radars are set around the vehicle, when an obstacle is on the right side of the vehicle, an ultrasonic radar on the right side of the vehicle is used, and when an obstacle is on the left side of the vehicle, an ultrasonic radar on the left side of the vehicle is used. If the radars are laser radars and are set on the top of the vehicle, information about obstacles within 360 degrees around the vehicle can be obtained by using the laser radars on the top of the vehicle. A quantity of radars may be set according to a specific requirement. Usually, 6 to 16 ultrasonic radars, and/or 1 to 4 laser radars, and/or 1 to 4 millimeter-wave radars may be disposed on one vehicle. Based on the obtained echo signal and time of flight, a coordinate value of a center of the obstacle in a vehicle reference coordinate system can be determined based on a radar wave velocity by using a geometric method.

With reference to another possible implementation of the first aspect, a geometric size of the obstacle may be determined based on an echo width and a time of flight of a single radar, because the obstacle cannot be a "point" in a geometric sense, and the obstacle has a specific geometric size. However, a sound wave/electromagnetic wave emitted by a same radar may be reflected back at different positions of the obstacle in different times. The size of the obstacle may be generally determined based on the echo width and different times of flight. After the size of the obstacle is generally determined, the obstacle may be abstracted/simplified into a circle with a radius of r. A center of the circle corresponds to the coordinate value of the center of the obstacle in the vehicle reference coordinate system. Probabilities are distributed from the center of the circle to a circumference in a linear decreasing manner by using the center of the circle as a center and the circumference as an edge. Coordinates of the center of the circle correspond to the coordinate value of the center of the obstacle in the vehicle reference coordinate system. A probability at the center of the circle is the highest, and a probability at the circumference is the lowest.

With reference to another possible implementation of the first aspect, a fusion weight function may be used in combination with the probability distributions of the obstacle generated by using the camera and the radar, to obtain the probability grid map. In some embodiments, the following fusion weight function may be selected:

$$W(d) = \begin{cases} 1, & d > d_{max} \\ \dfrac{d}{d_{max}}, & d \le d_{max} \end{cases}$$

Herein, $d_{max}$ represents a boundary distance that can be detected by using the radar.

A probability value of a fused target grid point is:

$$P = W \cdot P_{IPM} + (1-W) \cdot P_{USS}$$

$P_{IPM}$ represents the probability distribution of the obstacle obtained by using the camera, and $P_{USS}$ represents the probability distribution of the obstacle obtained by using the radar. The camera may include a fisheye camera, and the radar may include at least one of an ultrasonic radar, a laser radar, and a millimeter-wave radar.

According to a second aspect, an embodiment of this application further provides an autonomous driving assistance system. The system includes: a camera apparatus, where the camera apparatus is configured to obtain image data; at least one radar, where the radar is configured to obtain a radar echo signal; and a processor, where the processor is configured to perform the following operations: processing, by using a neural network, the image data obtained by the camera apparatus, to obtain a first probability distribution of an obstacle; obtaining a second probability distribution of the obstacle based on a time of flight and an echo width of a radar echo signal; and obtaining, based on the first probability distribution of the obstacle and the second probability distribution of the obstacle, a drivable area of a vehicle represented by a probability, where the probability is a probability that the vehicle cannot drive through the area.

It may be understood that the system provided in the second aspect corresponds to the method provided in the first aspect. Therefore, for implementations of the second aspect and technical effects that can be achieved by the implementations of the second aspect, refer to related descriptions of the implementations of the first aspect.

With reference to another possible implementation of the second aspect, the system further includes a display apparatus, and the display apparatus is configured to display a probability grid map.

According to a third aspect, an autonomous driving vehicle is provided, including the autonomous driving assistance system in the second aspect.

According to a fourth aspect, an embodiment of this application provides a computer-readable storage medium, including an instruction set. The instruction set may be executed by a processor to implement the method according to any implementation of the first aspect.

Various embodiments of this application provide a vehicle drivable area detection method, an autonomous driving assistance system, and an autonomous driving vehicle including the system. In embodiments of this application, a plurality of sensors are used to obtain information about an environment and an obstacle around a vehicle, the obtained information is fused based on different features of different sensors, and the information is presented in a form of a probability grid map, so that a drivable area around the vehicle can be more accurately recognized. In another aspect, in this application, manners such as obstacle parallax information and obstacle mapping are used, so that the technical solutions in this application can have high generalization, are widely applicable to a plurality of scenarios, and do not depend on training data. Therefore, the technical solutions in this application are robust, and can be widely applicable to different levels of autonomous driving solutions, systems, and vehicles. In still another aspect, the technical solutions of this application are particularly applicable to an autonomous driving scenario in which there are a large quantity of obstacles around a vehicle, for example, an autonomous parking scenario.

DETAILED DESCRIPTION OF ILLUSTRATIVE EMBODIMENTS

Embodiments of this application provide a vehicle drivable area detection method, a system, and a parking apparatus using the system. Information is obtained by using a plurality of sensors on a vehicle, and the information is fused by using a given method, so that a drivable range around the vehicle can be accurately recognized, a new solution is provided for the vehicle drivable area detection method, and support is provided for improving autonomous driving reliability and optimizing driving experience of a user.

Figure 1:
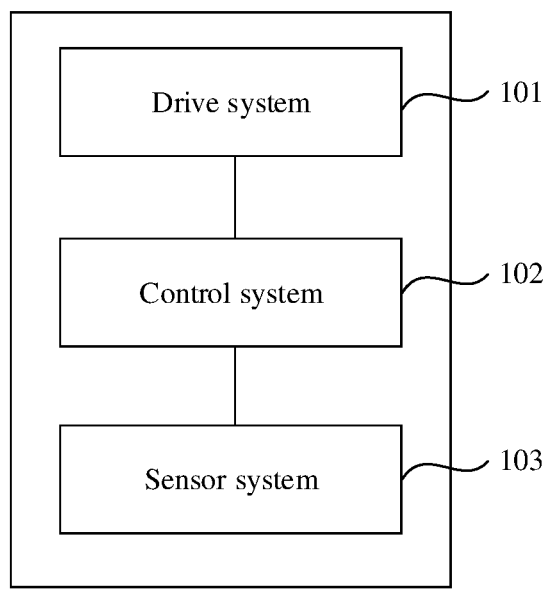
FIG. 1 is a schematic diagram of a structure of an autonomous driving vehicle according to an embodiment of this application.

Refer to FIG. 1. In some embodiments, a vehicle 100 with an autonomous driving function is provided. The vehicle 100 may include a drive system 101, a control system 102, a drive system 103, and the like. The sensor system 101 may include, for example, but is not limited to, a global positioning system, an inertial navigation device, a laser radar, a millimeter-wave radar, and a camera. The control system 102 may include, for example, but is not limited to, a system/apparatus, for example, an autonomous driving vehicle computing platform. The drive system 103 may include, for example, but is not limited to, an engine, a transmission apparatus, an electric energy source, and a wire-controlled system. The vehicle 100 may further include, but is not limited to, an autonomous driving assistance system (Advanced Driving Assistance System, ADAS for short). The sensor system 101, the control system 102, and the drive system 103 may be communicatively connected.

With reference to FIG. 2 to FIG. 6, the following further describes in detail the vehicle drivable domain detection method provided in embodiments of this application.

Figure 2:
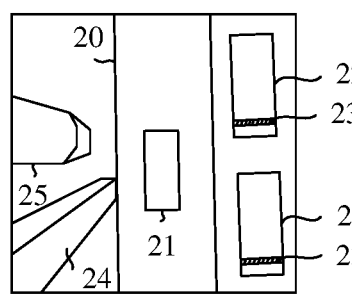
FIG. 2 is a schematic diagram of obstacle recognition based on image data according to an embodiment of this application.
Figure 2:
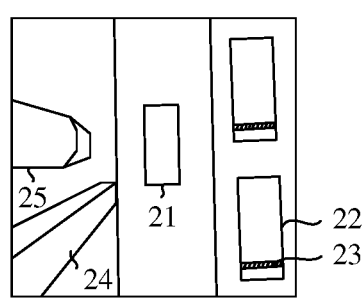
Figure 2:
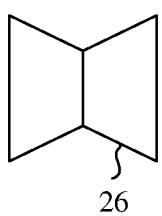
Figure 2:
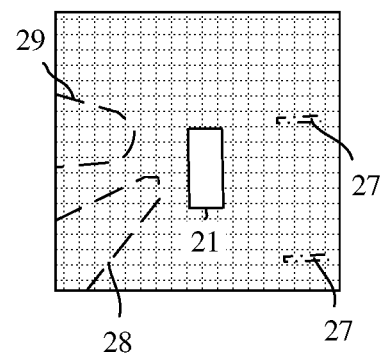

FIG. 2 is a schematic diagram of obstacle recognition based on image data according to an embodiment of this application. The left side of FIG. 2 shows top views of frames T and T+1 that are adjacent in terms of time, the middle part of FIG. 2 shows a neural network 26 used for obstacle recognition, and the right side of FIG. 2 shows a final recognition result. The following describes an obstacle recognition process in detail.

In a scenario shown in FIG. 2, a vehicle 21 travels on a lane 20, obstacles on the left side of the vehicle 21 include a pillar 24 and a static vehicle 25, there are two parking spots 22 on the right side of the vehicle 21, and an area of each parking spot 22 further includes a parking block 23.

One or more camera apparatuses may be disposed around the vehicle 21, and image data around the vehicle 21 may be obtained by the camera apparatus. In some embodiments, the camera apparatus configured to obtain image data may be a fisheye camera. The fisheye camera has a feature of a small blind spot, so that information around the vehicle can be obtained as much as possible. It should be understood that another type of proper camera, for example, but not limited to a common camera, a wide-angle camera, or a wide-field-of-view camera, may alternatively be used without violating the spirit of this application.

In some embodiments, a plurality of images around the vehicle are obtained by using a plurality of fisheye cameras, and the plurality of images are processed into a top view through time alignment. For autonomous driving of the vehicle, a top view may comprehensively reflect information about an overall environment around the vehicle.

In some embodiments, a procedure for generating a top view includes: (1) performing dedistortion processing based on a distortion parameter of a camera; (2) performing perspective transformation to switch from a camera coordinate system to an image coordinate system; and (3) performing image stitching and brightness balance fusion. The three processes are described as follows.

(1) Distortion of the camera is radial distortion caused by a special shape of a lens. In practice, if r=0, the first several expansion items of Taylor series are usually used to approximately describe the radial distortion. Coordinates before and after the radial distortion is corrected are expressed as follows:

$$x_{rcorr} = x_p(1+k_1r^2+k_2r^4+k_3r^6)$$

$$y_{rcorr} = y_p(1+k_1r^2+k_2r^4+k_3r^6)$$

(2) The generating the top view includes: converting each pixel in the top view into coordinates of a point of a corresponding world coordinate system on the ground based on a ratio of a physical size to the pixel. For the coordinates in the world coordinate system, during generation of the top view, a to-be-used image of a camera is first determined, then coordinates of the point in a camera coordinate system are obtained by using a spatial coordinate system conversion formula, and then coordinates of the point in an image coordinate system and a pixel coordinate system are obtained by formulating an intrinsic and extrinsic parameter model of the camera.

(3) When images of a plurality of angles of view are stitched, different parts of an image obtained through stitching are prone to have luminance and color differences, and stitching parts of the image are prone to have obvious stitches (caused by color differences of imaging of different cameras in a same area). To resolve this problem, a pixel value of an overlapping area of images that are on both sides of the stitching part and obtained by cameras is used. During generation of the top view, luminance balance processing is performed, through gamma correction, on the parts of the image that have the luminance difference, the image is converted into a YUV format, luminance of parts that are of the images and that are in the overlapping area is calculated, and the luminance is adapted to a Y channel of the overall top view. The parts of the image with stitches may be processed through Alpha blending (Alpha Blending) of the image. In an implementation, any two images may be combined into one image, and a pixel value of the combined image may be obtained according to the following formula (1):

$$I=(1-a)\times I_1+a\times I_2 \quad \text{Formula 1}$$

Herein, a indicates blending transparency, and a value of a is between [0, 1]. In the overlapping area, the value of a gradually changes from 0 to 1 from one image to another image. At a stitch of the image, the value of a, for example, may be 0.5.

After steps (1), (2), and (3), the top view of the surrounding environment of the vehicle may be obtained by using the camera apparatus around the vehicle, as shown in the left part of FIG. 2.

In the foregoing top view generation process, it is assumed that all pixels (including pixels of an obstacle) have a same height, for example, all pixels come from the ground. However, points of obstacles may have different heights. In a process of converting objects of different heights from three-dimensional to two-dimensional, obvious deformation occurs, and the deformation varies based on different observation angles (that is, different positions of the fisheye camera) and different heights of obstacles. A higher obstacle corresponds to larger deformation, and therefore a parallax in different image frames is more obvious. Refer to the pillar 24 in FIG. 2. Because the pillar 24 has a high height, the pillar 24 is greatly deformed in the top view. However, because the parking block 23 in FIG. 2 has a low height (usually, the height of the parking block 23 is about 10 to 20 cm), the parking block 23 basically does not deform in the top view. In the technical solutions of this application, parallax information is used as a part of input of the neural network 26, so that the neural network can better recognize an obstacle.

The neural network 26 may use an encoder-decoder (Encoder-Decoder) architecture, for example, an encoder and a decoder. The encoder is configured to perform dimension reduction on data by using a pooling layer. The decoder is configured to perform dimension increasing on data by using a deconvolutional layer. The encoder is configured to recognize a texture feature of the obstacle, and the decoder is configured to better restore details of the obstacle. Although the encoder-decoder architecture is used in some embodiments, the neural network in the solutions of this application is not limited to the architecture. Any other suitable neural network (for example, including but not limited to using a convolution-pooling-fully connected architecture) may be selected based on an actual situation without violating the spirit of this application.

In a conventional process of recognizing an image by using the neural network, a texture feature of an object in an image frame is usually used for object recognition (semantic segmentation). However, as described above, object parallax information in different frames of the top view may be used as a characterization feature of an obstacle. In this application, input of the neural network is not limited to a single-frame image, and further includes a plurality of frames of associated images in terms of time, for example, T and T+1 frames of images shown in FIG. 2. The two frames of images are adjacent in terms of time. The neural network recognizes information about obstacle by using parallax information of the obstacle in the images that are adjacent in terms of time in combination with a conventional texture-based obstacle recognition method. An advantage brought by introducing parallax information is that a trained model can be better generalized to a scenario that does not exist in a model training set. Because it is difficult for a training dataset to include shapes of all possible obstacles, the neural network learning based on a texture feature has a problem of difficult generalization. Deformation caused by a parallax is a general rule of physics. Through learning parallax information to determine obstacles, a neural network model is enabled to have a better generalization capability, that is, the neural network model can be applied to a plurality of different scenarios based on a small amount of training data. It should be understood that, although obstacle recognition is described in the foregoing embodiment by using a pair of images that are adjacent in terms of time, in some other implementations, obstacle recognition may alternatively be performed based on an actual situation by using a pair of images having a specific interval of frames in terms of time. For example, a pair of images at a moment T and a moment T+2 (with an interval of one frame) or a pair of images at a moment T and a moment T+3 (with an interval of two frames) may be used for obstacle recognition. When a speed of the vehicle is high, nearest neighboring images on a time frame may be selected for input, because when the speed of the vehicle is high, a parallax of an object in a short time interval may be obvious. In addition, when the speed of the vehicle is low, images with an interval of two frames, three frames, or more frames on the time frame may be selected for input.

In some embodiments, semantic segmentation is performed on the image frame by using the neural network 26, that is, obstacles in the image frame are recognized and classified. For example, image areas may be classified into three types.

(1) Freespace (Freespace) is an area in which the vehicle may travel freely. For example, the lane 20 belongs to the freespace.

(2) A high obstacle (High Obstacle) area is an area in which the vehicle cannot travel. For example, the pillar 24 belongs to the high obstacle area.

(3) A low obstacle (Low Obstacle) area is an area in which the vehicle does not travel in most cases but may travel in a special case. For example, the parking block 23 belongs to the low obstacle area, and the vehicle may pass (roll over) the parking block 23.

It should be understood that the foregoing classification of semantic segmentation is based on examples of embodiments, and a person skilled in the art may use a proper semantic segmentation type based on an actual requirement without violating the spirit of this application.

In some embodiments, an obstacle probability distribution diagram may be obtained based on a semantic segmentation type of an obstacle that is output by the neural network, to represent a non-drivable area of the vehicle or a drivable area of the vehicle. In some other embodiments, a probability grid map may be used to represent a non-drivable area of the vehicle or a drivable area of the vehicle. FIG. 2 is used as an example. The right side of FIG. 2 shows a probability grid map in this embodiment. Each grid point in the probability grid map has its own probability value, and the probability value of each grid point represents a probability that the grid point is an obstacle (that is, the vehicle cannot drive through an area). For example, an area 28 and an area 29 shown by dashed lines in FIG. 2 represent high obstacle areas (the vehicle and the pillar) recognized by the neural network, and the areas are non-drivable for the vehicle 21. A probability value of grid points in the area 28 and the area 29 in FIG. 2 may be set to 1. An area 27 in FIG. 2 represents a low obstacle area (the parking block) recognized by the neural network, and the area is drivable for the vehicle 21. Therefore, a probability value of grid points in the area 27 may be set to a number between 0 to 1 according to a requirement. However, the road area 21 in FIG. 2 is recognized as freespace, and a probability value of grid points in the road area may be set to 0. In some other embodiments, a probability value may be set opposite to the probability value in the foregoing embodiment, that is, the probability value represents a probability that the vehicle can drive through the area.

In some embodiments, when the probability value represents that the vehicle cannot drive through the area, if high security needs to be ensured, all grid points at which a probability is not 0 may be set as non-drivable areas of the vehicle. In this case, there are two types of areas in the probability grid map: drivable area and non-drivable area.

On a road or a driving area, because a small obstacle (for example, a traffic cone or a tire) occupies a small area/volume, in a neural network training process, even if a determining error occurs, a cost value of a loss function is small. As a result, the neural network has low sensitivity to recognizing the small obstacle, and the small obstacle may be difficult to be recognized. Compared with a large obstacle, it is difficult for a vehicle driver or an autonomous driving assistance system to perceive/recognize a small obstacle. Therefore, a small obstacle is more likely to cause a collision with the vehicle. To resolve this problem, in some embodiments, in a training process of the neural network 26, compared with a large obstacle, a high weight is given to a small obstacle in the loss function. In some embodiments, the loss function may be adjusted by using formula (2):

$$\text{Loss} = \text{loss}_{segmentation} + A * \text{loss}_{small_{obstacle}} \quad \text{Formula (2)}$$

A is an adjustment parameter. In some embodiments, A may be a selected value from 8 to 12, and A may be an integer, for example, 10, or may be a decimal, for example, 9.5.

Herein, $\text{loss}_{segmentation}$ and $\text{loss}_{small\_obstacle}$ may be functions learned in the machine learning field, for example, (but not limited to) Sigmoid, L1-loss, and L2-loss, and $\text{loss}_{segmentation}$ is a loss function used for calculating pixels in different segmentation areas (for example, the freespace, the high obstacle area, or the low obstacle area) after semantic segmentation is performed on the image, and $\text{loss}_{small\_obstacle}$ is a loss function used for calculating pixels of a small obstacle in the image. When there is a small obstacle, the overall loss function Loss may be large (higher than a loss function when no small obstacle occurs) by combining $\text{loss}_{segmentation}$ and $\text{loss}_{small\_obstacle}$. Therefore, in this embodiment of this application, the neural network has a high probability of recognizing a small obstacle.

In some embodiments, the small obstacle includes but is not limited to a common object on the road, for example, a conical tube, a wheel stop, or a parking lock. From an image perspective, if pixels of an object in a top view are fewer than 300 pixels, the object may also be considered as a small obstacle.

Through the foregoing adjustment, the trained neural network 26 in this application can have a better recognition capability for a small obstacle.

During data collection, there are few short-distance obstacles or direct collisions between obstacles and vehicles. Therefore, in a current image training sample, almost no obstacle appears in a short-distance range of the vehicle. As a result, there is a lack of the obstacle (image) training sample in a short-distance surrounding area of the vehicle. This lack makes the neural network overfit and output a recognition result that the surrounding area of the vehicle is a drivable area, even if there is an obstacle in the surrounding area of the vehicle.

To resolve a training problem caused by unbalanced data distribution (that is, the lack of the obstacle training sample in the short-distance surrounding area of the vehicle), in some embodiments, an obstacle mapping method is introduced for data augmentation, to improve a detection rate of a near obstacle.

Figure 3:
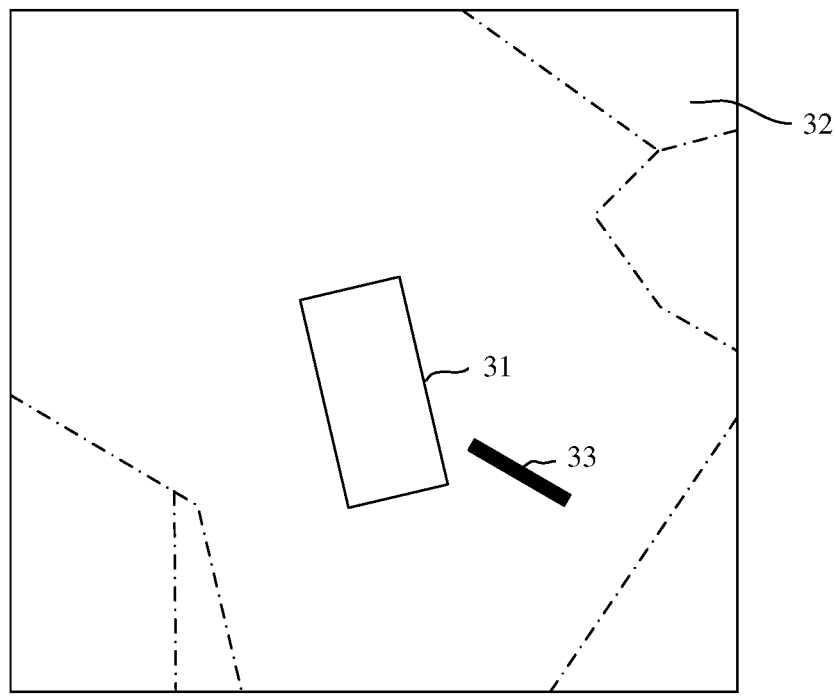
FIG. 3 is a schematic diagram of an obstacle mapping method according to an embodiment of this application.

FIG. 3 is a schematic diagram of an obstacle mapping method. A surrounding environment of a vehicle 31 includes an actual obstacle shown by a dashed line range 32. An obstacle 33 may be "mapped" into an image before the image is sent to a neural network for learning. The obstacle 33 is not an obstacle existing in an actual scenario, but is virtually "mapped" into the image. An image obtained through mapping is sent to the neural network for training of the neural network. In this way, when there is no short-distance obstacle in the actual scenario, the neural network can be well trained, and therefore, an overfitting phenomenon does not occur in the neural network.

In some embodiments, an obstacle is randomly mapped into an area range around the vehicle, and a rotation angle of the obstacle changes based on an angle range of a camera in which the obstacle is captured, to avoid an unreal image. In some embodiments, a type of the obstacle may be randomly selected, for example, but is not limited to a roadblock, a cart, an animal, or a pedestrian.

Figure 4:
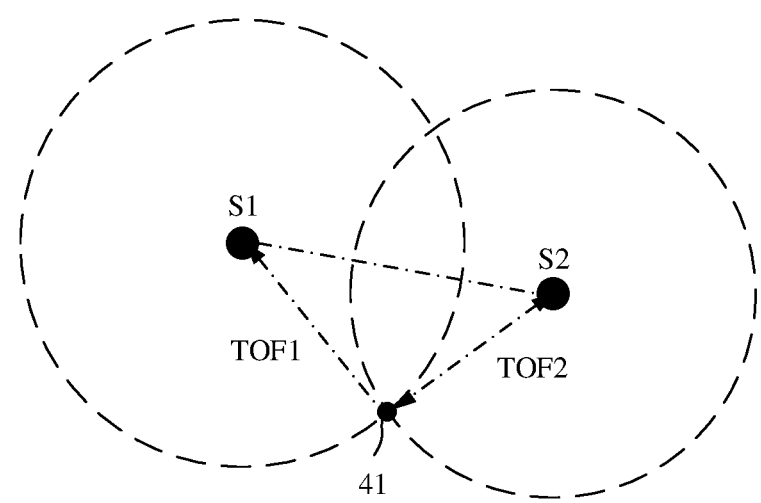
FIG. 4 is a schematic diagram of determining obstacle coordinates based on radar data according to an embodiment of this application.
Figure 5:
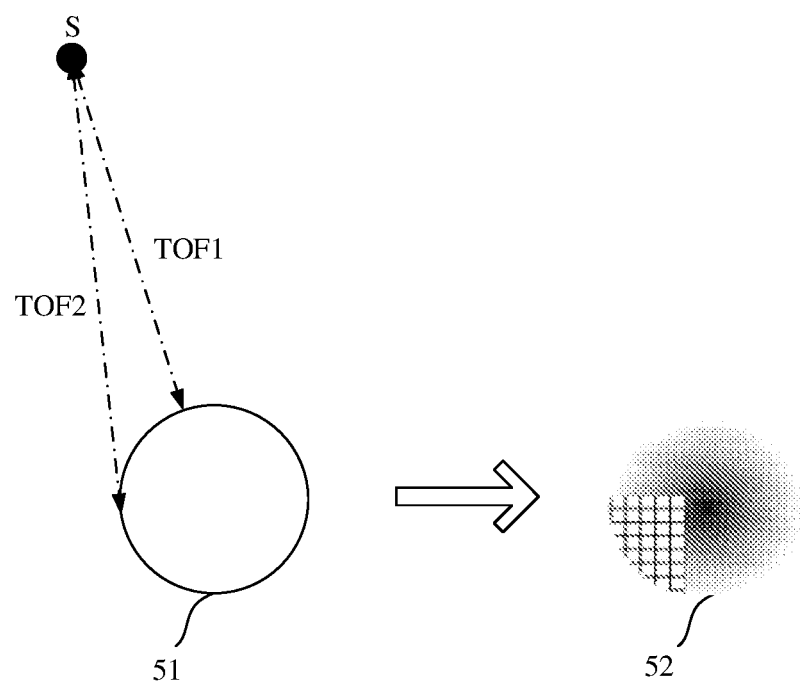
FIG. 5 is a schematic diagram of determining a size and a probability distribution of an obstacle based on radar data according to an embodiment of this application.

FIG. 4 and FIG. 5 are schematic diagrams of recognizing obstacles by using radars according to embodiments. In some embodiments, ultrasonic radars may be used. There may be 6 to 12 ultrasonic radars disposed around the vehicle 21 usually, which may include long-range radars and short-range radars.

FIG. 4 is a schematic diagram of recognizing an obstacle by using two ultrasonic radars. An ultrasonic radar S2 is driven to transmit a signal, and the ultrasonic signal is received by S1 and S2 after being reflected by an obstacle 41. Relative positions of the obstacle 41 and the ultrasonic radars S1 and S2 may be positioned based on different times of flight TOFs (Times of Flight). Further, coordinates of a center of the obstacle relative to a vehicle reference coordinate system may be obtained by using a triangulation position method. For a specific calculation process, refer to the following descriptions.

If S2 emits a wave and S1 and S2 receive valid echoes, distances between the obstacle 41 and S2 and between the obstacle 41 and S1 are given by the following formula (3):

$$\begin{cases} d_2 = (TOF_2 \cdot v_{uss})/2 \\ d_1 = TOF_1 \cdot v_{uss} - d_2 \end{cases} \quad \text{Formula (3)}$$

$TOF_1$ and $TOF_2$ respectively represent times of flight obtained by the ultrasonic radars S1 and S2, and $v_{uss}$ represents a propagation speed of a sound wave at a normal temperature.

Therefore, a specific coordinate value $(x_{obj}, y_{obj})$ of the center of the obstacle 41 in the vehicle reference coordinate system may be calculated according to the following formula (4):

$$\begin{cases} (x_{obj} - x_1)^2 + (y_{obj} - y_1)^2 = d_1^2 \\ (x_{obj} - x_2)^2 + (y_{obj} - y_2)^2 = d_2^2 \end{cases} \quad \text{Formula 4}$$

Herein, $(x_1, y_1)$ and $(x_2, y_2)$ are respectively coordinate values of the ultrasonic radars S1 and S2 relative to the vehicle reference coordinate system.

In some embodiments, as shown in FIG. 5, a single ultrasonic radar may be used to send an ultrasonic wave and receive an echo signal, to obtain an echo width of the echo signal and a time of flight. A geometric shape of an obstacle may be obtained based on the echo width and the time of flight. In some embodiments, for convenience, the obstacle may be abstractly defined as a circle with a radius of r on a two-dimensional plane, and coordinates of a center of the circle corresponds to the center of the obstacle recognized by the two ultrasonic radars, the radius r of the circle may be determined by using the following formula (5):

$$\begin{cases} d_1 = (TOF_1 \cdot v_{uss})/2 \\ d_2 = (TOF_2 \cdot v_{uss})/2 \\ TOF_2 = TOF_1 + ECHO_1 \\ d_2^2 + r^2 = (d_1 + r)^2 \end{cases} \quad \text{Formula (5)}$$

Herein, $ECHO_1$ represents the echo width, $d_1$ represents a shortest echo distance, and $d_2$ represents a longest echo distance. Because the obstacle has a specific geometric size, the ultrasonic wave is reflected by different parts of the obstacle, so that the ultrasonic wave has the shortest echo distance $d_1$ and the longest echo distance $d_2$.

It should be understood that, in this embodiment, for convenience, the obstacle is abstractly defined as the circle with the radius of r, and a person skilled in the art may also abstractly define the obstacle as another proper geometric shape, for example, a rectangle or a polygon.

In some embodiments, linear probability distribution is performed on the geometric circle of the recognized obstacle. In some embodiments, it is determined that the center of the circle corresponds to a coordinate value of the center of the obstacle in the vehicle reference coordinate system. At the center of the circle, a probability of the obstacle is 100%, and the probability linearly decreases from the center radially outward to a circumference. That is, a probability of the obstacle at a radial r/2 circumference of the circle may be 50%, and a probability of the obstacle at the circumference r of the circle is 0. It should be understood that linear distribution of probabilities is an optional manner based on some embodiments, and a person skilled in the art may select another proper probability attenuation function (for example, an e exponential attenuation) based on an actual situation without violating the spirit of this application.

In some embodiments, the foregoing obstacle probability distribution is implemented by using a gird map. The right side of FIG. 5 shows an example diagram. An obstacle 51 is presented as a probability distribution diagram 52 after being recognized by the ultrasonic radar. At the center of the circle, a probability is highest and a color is darkest, and at the circumference, a probability is lowest and a color is lightest.

In some embodiments, the foregoing process may be further implemented by using, for example, a laser radar or a millimeter-wave radar, provided that a sound velocity in the foregoing calculation process is replaced with a light velocity.

In some embodiments, probability distributions of the obstacle obtained by using a fisheye camera and the ultrasonic radar may be fused by using a fusion weight function W, to obtain a probability grid map. For example, fusion processing may be performed with reference to the fusion weight function in the following formula (6). In formula (6), the fusion weight function W may be a function of a distance d, and d represents a distance between a target grid point (the obstacle) and the vehicle.

$$W(d) = \begin{cases} 1, & d > d_{max} \\ \dfrac{d}{d_{max}}, & d \le d_{max} \end{cases} \quad \text{Formula (6)}$$

Herein, $d_{max}$ represents a boundary distance that can be detected through an ultrasonic wave.

A probability value of a fused target grid point is given by the following formula (7):

$$P = W \cdot P_{IPM} + (1-W) \cdot P_{USS} \quad \text{Formula (7)}$$

$P_{IPM}$ represents an obstacle probability distribution of a target grid point obtained by using the fisheye camera, and $P_{USS}$ represents an obstacle probability distribution of a target grid point obtained by using the ultrasonic radar.

Based on the foregoing formula (6), it can be learned that if the distance d between the obstacle and the vehicle exceeds a distance boundary that can be detected by the ultrasonic radar, W=1. When W=1, $(1-W)*P_{USS}$ in the foregoing formula (7) is 0, which indicates that the ultrasonic radar cannot effectively detect the obstacle in this case, and the vehicle obtains the probability distribution of the obstacle by using the fisheye camera.

Based on the foregoing formula (6), it can be further learned that when d and $d_{max}$ are small (for example, less than 0.2), a weight of the ultrasonic radar in formula (7) is large. This can resolve a problem that a visual recognition effect is poor due to a visual blind spot of the fisheye camera when an obstacle is close to the vehicle.

It should be understood that the foregoing fusion weight function and fusion formula are merely implementation examples based on embodiments, and a person skilled in the art may select any another proper form of the fusion weight function and another fusion formula based on an actual situation without violating the spirit of this application.

It should be understood that, in addition to the fisheye camera and the ultrasonic radar, a person skilled in the art may properly select another apparatus, for example, a high-precision camera, a wide-angle camera, a laser radar, or a millimeter-wave radar, based on a situation, to implement the foregoing technical process without violating the spirit of this application.

Two-dimensional grid points obtained after the foregoing fusion form the probability grid map represented by a probability. A probability that an obstacle exists at a grid point is distributed from 0% to 100%. Based on different probabilities at the grid point, the vehicle may determine areas in which the vehicle can drive freely, areas in which the vehicle cannot drive, and areas in which the vehicle can drive in a specific case. In some embodiments, the generated probability grid map may be displayed on a cockpit display of the vehicle for reference by a driver.

It can be learned from the foregoing descriptions that, in the technical solutions provided in embodiments of this application, the obstacle probability distributions obtained by using sensors such as the camera apparatus and the radar are combined, so that an autonomous driving vehicle using the technical solutions of this application can comprehensively obtain information about an obstacle around the vehicle, and avoid information loss caused by a blind spot or a measurement limit of a single sensor. In addition, in the technical solutions provided in embodiments of this application, in a training process of the neural network and a processing process of image information, technical means such as an obstacle mapping method, weight enhancement of a small obstacle loss function, and introduction of parallax information between consecutive image frames are used, so that the neural network in the technical solutions of this application can more accurately recognize information about an obstacle around the vehicle based on the image information.

Figure 6:
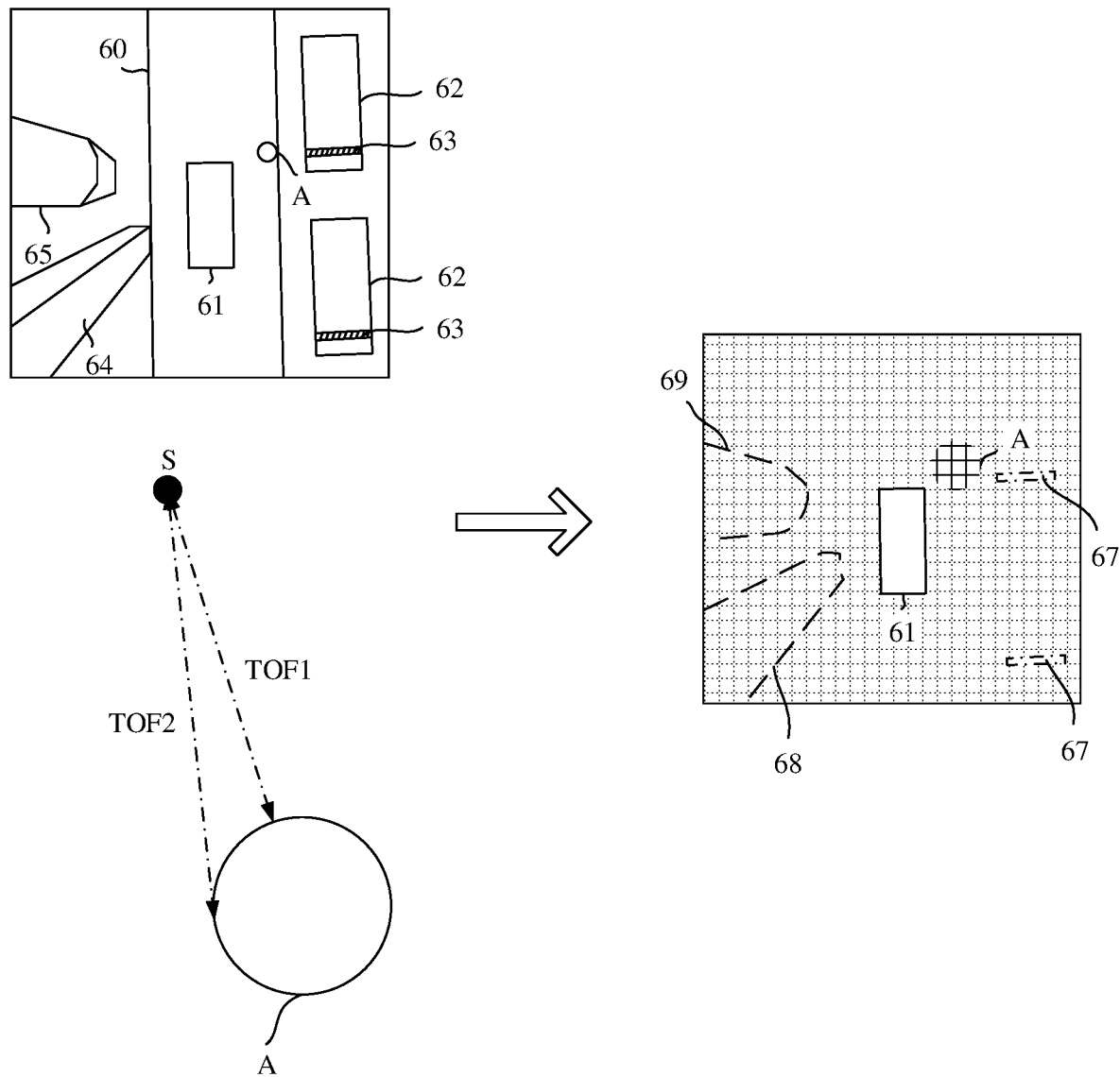
FIG. 6 is a schematic diagram of performing drivable area fusion based on image data and radar data according to an embodiment of this application.

FIG. 6 shows a process of recognizing an obstacle based on a combination of a fisheye camera and an ultrasonic radar in some embodiments, which is similar to the scenario in FIG. 2 (a process of a plurality of frames of images is omitted in FIG. 6). Herein, 64 represents a pillar, 65 represents a static vehicle, a vehicle 61 travels on a road 60, there are two parking spots 62 on the right side of the vehicle 61, and each parking spot 62 further includes a parking block 63. On a probability grid map on the right side of FIGS. 6, 68 and 69 represent high obstacle areas (respectively corresponding to the pillar 64 and the static vehicle 65 on the left side of FIG. 6), and 67 represents a low obstacle area (corresponding to the parking block 23 on the left side of FIG. 6). Different from the scenario in FIG. 2, a low obstacle A (for example, but not limited to a robotic vacuum cleaner) that is close to the vehicle exists on the road 60. A camera has a blind spot, and a height of the robotic vacuum cleaner may be very low. Therefore, if a surrounding environment of the vehicle is recognized only by using the fisheye camera, the obstacle A may be missed or cannot be recognized. In this embodiment, the ultrasonic radar is combine. The ultrasonic radar may obtain a position and a geometric shape of the obstacle A through positioning and size recognition in the foregoing embodiments, and define the position and the geometric shape as a circular obstacle probability distribution with a radius of r. The probability grid map shown on the right side of FIG. 6 may be obtained by combining obstacle probability distribution information recognized by the ultrasonic radar and obstacle probability distribution information recognized by the fisheye camera, and shows a probability distribution of the obstacle A. In some embodiments, the probability grid map may be further transmitted to an autonomous driving assistance system (Advanced Driving Assistance System) of the vehicle. Therefore, the ADAS system can "learn", based on the obtained probability grid map, that there is an obstacle in a front-right road area. Therefore, the ADAS system can properly avoid the obstacle during route planning. In some other embodiments, if a human driver is driving the vehicle, the probability grid map may alternatively be displayed on a display of a cockpit of the vehicle, to prompt the driver that there is an obstacle in the road area on the front right and the driver should perform proper avoidance.

In the foregoing embodiments, both the camera apparatus and the radar are disposed on a same vehicle. In some other embodiments, the camera apparatus and the radar may alternatively be separately disposed on different vehicles. For example, a camera apparatus is disposed on a vehicle A, a radar is disposed on a vehicle B, and the vehicles A and B communicate with each other and transfer/exchange respective information or obtained information through a communications network. In this way, even if only one type of sensor is disposed on the vehicle A or the vehicle B, the vehicle A or the vehicle B may obtain information about two types of sensors under a specific condition, and further obtain information about an obstacle around the vehicle according to the technical solutions disclosed in embodiments of this application.

In some other embodiments, in a vehicle-road collaboration scenario, the camera apparatus and/or the radar may alternatively be disposed on a road or an apparatus around a road. For example, the camera apparatus may be disposed on a telegraph pole or a monitoring apparatus around a road. For another example, the camera apparatus and/or the camera apparatus may be disposed on an apparatus, for example, a lamp post, a speed measuring pole, or a communication base station tower on a road side. The camera apparatus and/or the radar may communicate with a vehicle through, for example, V2X (Vehicle to Everything), and transmit obtained information to the vehicle. Based on vehicle-road collaboration, the vehicle may be provided with only one type of sensor (for example, equipped with only a camera apparatus), or may obtain information about two types of sensors under a specific condition, and further obtain information about an obstacle around the vehicle according to the technical solutions disclosed in embodiments of this application.

Figure 7:
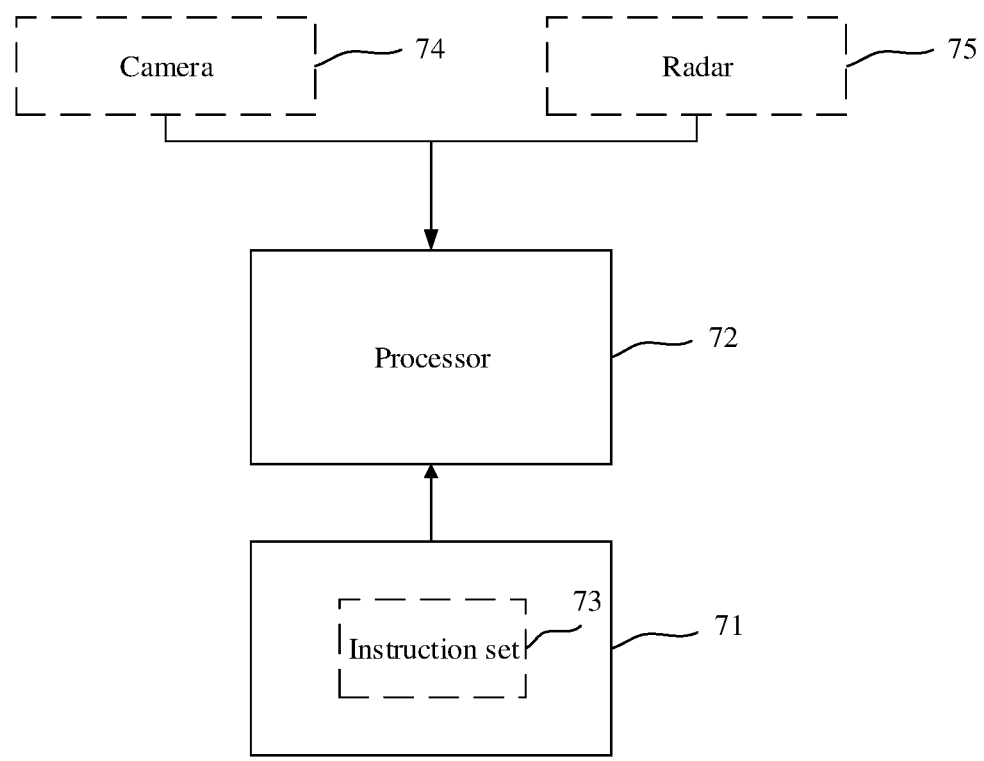
FIG. 7 is a schematic diagram of a computer-readable storage medium and a processor according to an embodiment of this application.

FIG. 7 shows a computer-readable storage medium 71 based on some embodiments. The computer-readable storage medium 71 stores an instruction set 73. The instruction set 73 may include the neural network described in the foregoing embodiments, obstacle position and probability calculation performed by using radar data, and logic for fusing an obstacle probability distribution obtained by using a camera apparatus and an obstacle probability distribution obtained by using a radar. The computer-readable storage medium 71 is configured to be communicatively connected to a processor 72. The processor 72 may be communicatively connected to a camera apparatus 74 and a radar 75 (shown by dashed lines in FIG. 7). After obtaining data of the camera apparatus 74 and the radar 75, the processor 72 may process the data based on the instruction set stored in the computer-readable storage medium 71, to implement the technical solutions in the foregoing embodiments. The processor 72 may include, for example, but is not limited to, a central processing unit (CPU: Central Process Unit), a graphic processing unit (GPU: Graphic Process Unit), a field programmable gate array (FPGA: Field Programmable Gate Array), a system on chip (SoC: System on Chip), an application-specific integrated chip (ASIC: Application-Specific Integrated Circuit), or a combination thereof.

Figure 8:
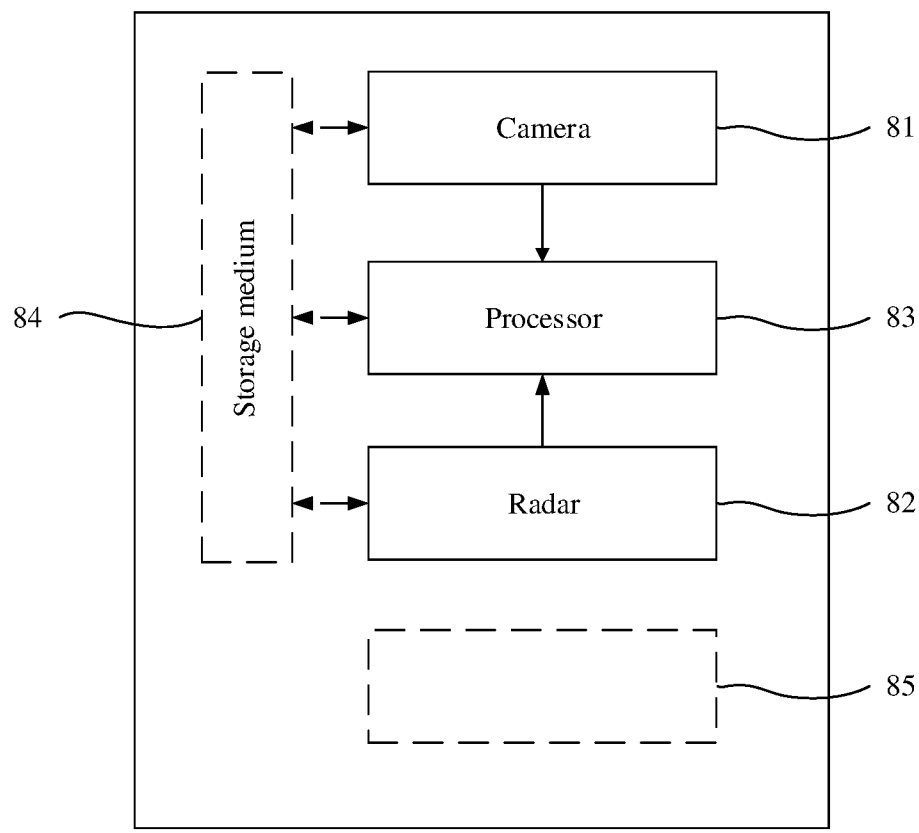
FIG. 8 is a schematic diagram of a structure of an autonomous driving assistance system according to an embodiment of this application.

FIG. 8 shows an autonomous driving assistance system 800 based on some embodiments. The system 800 includes a camera apparatus 81, a radar 82, and a processor 83. The camera apparatus 81 may be, for example, but is not limited to, the fisheye camera, the wide-angle camera, or the wide-field-of-view camera recorded in the foregoing embodiments. The radar 82 may be, for example, but is not limited to, the ultrasonic radar, the laser radar, or the millimeter-wave radar recorded in the foregoing embodiments. The processor 83 or the processor 72 may include, for example, but is not limited to, a central processing unit (CPU: Central Process Unit), a graphic processing unit (GPU: Graphic Processing Unit), a field programmable gate array (FPGA: Field Programmable Gate Array), a system on chip (SoC: System on Chip), an application-specific integrated chip (ASIC: Application-Specific Integrated Circuit), or a combination thereof. The processor 83 is configured to implement the vehicle drivable area detection method in the foregoing embodiments. For example, semantic segmentation processing is performed on image data by using a neural network, to obtain a type of an obstacle and a first probability distribution of the obstacle. A coordinate value of a center of the obstacle and a second probability distribution of the obstacle are determined based on a time of flight and an echo width. The first probability distribution of the obstacle and the second probability distribution of the obstacle are fused to obtain a drivable area of a vehicle represented by a probability, where the probability indicates a probability that the vehicle cannot drive through the area. The drivable area of the vehicle or the probability that the vehicle cannot drive through the area may be represented in a form of a probability grid map. The autonomous driving assistance system 800 may further include, for example, but is not limited to, a computer-readable storage medium 84 shown in FIG. 7. The computer-readable storage medium 84 stores an instruction set, and the instruction set includes instructions required for implementing one or more of the following functions: the neural network described in the foregoing embodiments, calculation of a position and a probability of an obstacle by using radar data, and fusion performed based on obstacle probability distributions obtained by a camera apparatus or fusion based on obstacle probability distributions obtained by a radar. The camera apparatus 81, the radar 82, and the processor 83 may be communicatively connected to the storage medium 84. Through the foregoing setting, the autonomous driving assistance system 800 may implement the technical solutions described in the foregoing embodiments. It should be understood that, in some embodiments, the autonomous driving assistance system 800 may further include one or more other function modules/apparatuses 85 (as shown by a dashed line in FIG. 8). For example, the function module 85 may be a display apparatus, and the display apparatus may display a probability grid map. In some embodiments, the autonomous driving assistance system 800 may be disposed on, for example, the vehicle 100 with an autonomous driving function shown in FIG. 1.

In some other embodiments, a robot is further provided. The robot may include the autonomous driving assistance system provided in embodiments of this application. To be specific, a camera apparatus and a radar may be disposed on the robot, surrounding obstacle information may be obtained based on the technical solutions described in embodiments of this application, and a route of the robot is properly planned based on the obtained obstacle information.

The embodiments of this application provide a vehicle drivable area detection method, a system, and an autonomous driving vehicle using the system. In the technical solutions of this application, a plurality of sensors are used, and obstacle probability information obtained based on the plurality of sensors is fused to obtain a probability grid map, so that a drivable area around a vehicle can be more accurately recognized. In addition, in this application, obstacle parallax information, an obstacle mapping method, and other manners are used, so that the technical solutions of this application can be highly generalized, and are widely applicable to a plurality of scenarios, without depending on training data. Therefore, the technical solutions of this application are robust. To sum up, the technical solutions of this application are widely applicable to autonomous driving solutions, systems, and vehicles at different levels.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In embodiments provided in this application, it should be understood that the disclosed system, apparatus, and method may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in the form of the software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, a network device, or the like) to perform all or some of the steps of the method described in embodiments of this application. The foregoing storage medium includes any medium that can store program code, such as a USB flash drive, a hard disk, a removable hard disk, a read-only memory (ROM, Read-Only Memory), a random access memory (RAM, Random Access Memory), a cache, an electrically programmable ROM (EPROM) memory, an electrically erasable programmable ROM (EEPROM) memory, a register, a flash memory, a magnetic disk, or an optical disc.

A person skilled in the art should be aware that in the foregoing one or more examples, the services described in this application may be implemented by hardware, software, firmware, or any combination thereof. When the services are implemented by software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a special-purpose computer.

In the foregoing specific implementations, the objectives, the technical solutions, and the benefits of this application are further described in detail. It should be understood that the foregoing descriptions are merely specific implementations of this application.

The foregoing embodiments are merely intended for describing the technical solutions of this application, rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A vehicle drivable area detection method, comprising:
processing, using a neural network, image data obtained by a camera apparatus, to obtain a first probability distribution of an obstacle;
obtaining a second probability distribution of the obstacle based on a time of flight and an echo width of a radar echo signal, wherein the echo width is a difference between a second time of flight of the echo signal and a first time of flight of the echo signal, wherein the second time of flight corresponds to a longest echo distance between a radar and the obstacle, and wherein the first time of flight corresponds to a shortest echo distance between the radar and the obstacle;
obtaining, based on the first probability distribution of the obstacle and the second probability distribution of the obstacle, a drivable area of a vehicle represented by a probability, wherein the probability is a probability that the vehicle cannot drive through the area; and either:
a) wherein the vehicle is an autonomous vehicle, planning a driving route for the vehicle based on the obtained drivable area;
or
b) wherein the vehicle is a manually driven vehicle, wherein the drivable area of the vehicle is represented in a form of a probability grid map; and wherein the probability that the vehicle cannot drive through the area is represented in the probability grid map, displaying the probability grid map on a display of the vehicle.

2. The method according to claim 1, wherein
the camera apparatus comprises at least one of the following: a fisheye camera, a wide-angle camera, or a wide-field-of-view camera; and
the radar echo signal comprises an echo signal of at least one of the following radars: an ultrasonic radar, a laser radar, and a millimeter-wave radar.

3. The method according to claim 1, wherein
the camera apparatus is disposed on at least one of the following positions: on the vehicle, on a road, on an apparatus around a road; and
the radar is disposed on at least one of the following positions: on the vehicle, on a road, or on an apparatus around a road.

4. The method according to claim 1, wherein
the neural network comprises an encoder and a decoder, the encoder is configured to perform dimension reduction on data by using a pooling layer, and the decoder is configured to perform dimension increasing on data by using a deconvolutional layer.

5. The method according to claim 1, wherein the processing, by using the neural network, image data obtained by the camera apparatus, to obtain the first probability distribution of the obstacle comprises:
performing, by using the neural network, semantic segmentation processing on the image data obtained by the camera apparatus, to obtain a type of the obstacle, wherein the type of the obstacle is one of a high obstacle type and a low obstacle type, and determining the first probability distribution of the obstacle based on the type of the obstacle.

6. The method according to claim 1, wherein
input of the neural network comprises a plurality of frames of images that are adjacent or spaced in terms of time.

7. The method according to claim 1, wherein
in a training process of the neural network, data enhancement is implemented by using an obstacle mapping method.

8. The method according to claim 1, wherein
a higher weight is given to a smaller obstacle in a loss function of the neural network.

9. An autonomous driving assistance system, comprising:
a camera apparatus, wherein the camera apparatus is configured to be capable of obtaining image data;
  at least one radar, wherein the radar is configured to be capable of obtaining a radar echo signal; and
  at least one processor; and
  a memory coupled to the at least one processor and storing programming instructions for execution by the at least one processor, the programming instructions for execution by the at least one processor, the programming instructions instruct the at least one processor to perform the following operations:
  processing, using a neural network, image data obtained by the camera apparatus, to obtain a first probability distribution of an obstacle;
obtaining a second probability distribution of the obstacle based on a time of flight and an echo width of a radar echo signal, wherein the echo width is a difference between a second time of flight of the echo signal and a first time of flight of the echo signal, wherein the second time of flight corresponds to a longest echo distance between a radar and the obstacle, and wherein the first time of flight corresponds to a shortest echo distance between the radar and the obstacle;
obtaining, based on the first probability distribution of the obstacle and the second probability distribution of the obstacle, a drivable area of a vehicle represented by a probability, wherein the probability is a probability that the vehicle cannot drive through the area; and either:
a) based on the autonomous driving assistance system being implemented in an autonomous vehicle, planning a driving route for the vehicle based on the obtained drivable area;
or
b) based on the autonomous driving assistance system being implemented in a manually driven vehicle, wherein the drivable area of the vehicle is represented in a form of a probability grid map; and wherein the probability that the vehicle cannot drive through the area is represented in the probability grid map, displaying the probability grid map on a display apparatus of the vehicle.

10. The system according to claim 9, wherein
the camera apparatus comprises at least one of the following: a fisheye camera, a wide-angle camera, or a wide-field-of-view camera; and
  the radar echo signal comprises an echo signal of at least one of the following radars: an ultrasonic radar, a laser radar, and a millimeter-wave radar.

11. The system according to claim 9, wherein
the neural network comprises an encoder and a decoder, the encoder is configured to perform dimension reduction on data by using a pooling layer, and the decoder is configured to perform dimension increasing on data by using a deconvolutional layer.

12. The system according to claim 9, wherein the programming instructions instruct the at least one processor to perform the following operation:
  performing, using the neural network, semantic segmentation processing on the image data obtained by the camera apparatus, to obtain a type of the obstacle, wherein the type of the obstacle is one of a high obstacle type and a low obstacle type, and determining the first probability distribution of the obstacle based on the type of the obstacle.

13. The system according to claim 9, wherein
input of the neural network comprises a plurality of frames of images that are adjacent or spaced in terms of time, and output of the neural network comprises a type of the obstacle and the first probability distribution of the obstacle.

14. The system according to claim 9, wherein
in a training process of the neural network, data enhancement is implemented by using an obstacle mapping method.

15. The system according to claim 9, wherein
a higher weight is given to a smaller obstacle in a loss function of the neural network.

16. The system according to claim 9, wherein the programming instructions instruct the at least one processor to perform the following operation:
  obtaining times of flight of the obstacle around the vehicle by using a plurality of radars, and determining coordinates of a center of the obstacle in a vehicle reference coordinate system based on the times of flight and wave velocities of the radars.

17. A computer program product comprising computer-executable instructions stored on a non-transitory computer-readable storage medium that, when executed by a processor, cause an apparatus to:
  processing, by using a neural network, image data obtained by a camera apparatus, to obtain a first probability distribution of an obstacle;
  obtaining a second probability distribution of the obstacle based on a time of flight and an echo width of a radar echo signal, wherein the echo width is a difference between a second time of flight of the echo signal and a first time of flight of the echo signal, wherein the second time of flight corresponds to a longest echo distance between a radar and the obstacle, and wherein the first time of flight corresponds to a shortest echo distance between the radar and the obstacle;
  obtaining, based on the first probability distribution of the obstacle and the second probability distribution of the obstacle, a drivable area of a vehicle represented by a probability, wherein the probability is a probability that the vehicle cannot drive through the area; and either:
  a) wherein the vehicle is an autonomous vehicle, planning a driving route for the vehicle based on the obtained drivable area;
  or
  b) wherein the vehicle is a manually driven vehicle, wherein the drivable area of the vehicle is represented in a form of a probability grid map; and wherein the probability that the vehicle cannot drive through the area is represented in the probability grid map, displaying the probability grid map on a display of the vehicle.

* * * * *

UNITED STATES PATENT AND TRADEMARK OFFICE
CERTIFICATE OF CORRECTION

PATENT NO. : 12,340,593 B2
APPLICATION NO. : 18/054353
DATED : June 24, 2025
INVENTOR(S) : Xia et al.

Page 1 of 1

It is certified that error appears in the above-identified patent and that said Letters Patent is hereby corrected as shown below:

In the Claims

Claim 3: Column 18, Line 42: "following positions: on the vehicle, on a road, on an" should read as -- following positions: on the vehicle, on a road, or on an --.

Signed and Sealed this
Eighteenth Day of November, 2025

John A. Squires
*Director of the United States Patent and Trademark Office*